United States Patent
Gehrke et al.

[15] 3,642,425
[45] Feb. 15, 1972

[54] PROCESS FOR THE CONTINUOUS DYEING OF SYNTHETIC FIBER MATERIALS WITH ANTHRAQUINOUS DYESTUFFS AND MIXTURES THEREOF

[72] Inventors: Gunter Gehrke; Volker Hederich, both of Cologne, Germany

[73] Assignee: Farbenfabriken Bayer Aktiengesellschaft, Leverkusen, Germany

[22] Filed: Aug. 21, 1970

[21] Appl. No.: 66,065

[30] Foreign Application Priority Data

Aug. 27, 1969 Germany.....................P 19 43 536.0

[52] U.S. Cl............................................8/25, 8/39, 260/371
[51] Int. Cl. .......................................................D06p 1/20
[58] Field of Search.................................8/39, 25; 260/371

[56] References Cited

UNITED STATES PATENTS 3,394,133  7/1968  Straley et al. .....................260/371 X
3,486,837  12/1969  Neeff et al. ..................................8/39
3,510,243  5/1970  Seuret et al...................................8/39

Primary Examiner—George F. Lesmes
Assistant Examiner—T. J. Herbert, Jr.
Attorney—Plumley & Tyner

[57] ABSTRACT

Process for the continuous dyeing of synthetic fiber materials from organic solvents, characterized in that the fiber materials are impregnated with dyestuffs liquors which contain anthraquinone dyestuffs of formula

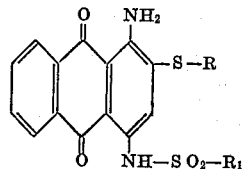

in which R represents a $C_1$–$C_{18}$-alkyl radical and $R_1$ denotes a $C_1$–$C_{18}$-alkyl, alkoxyalkyl, cycloalkyl or aralkyl radical or an optionally substituted phenyl radical, with the proviso that the sum of the carbon atoms present in total in R and $R_1$ is at least 6 and at most 36, and that the fibre materials are subsequently subjected to a heat treatment.

The dyeings obtained are distinguished by high dyestuff yield, very good buildup and excellent fastness properties, especially very good fastness to thermofixing, washing, rubbing and light.

3 Claims, No Drawings

PROCESS FOR THE CONTINUOUS DYEING OF SYNTHETIC FIBER MATERIALS WITH ANTHRAQUINOUS DYESTUFFS AND MIXTURES THEREOF

The invention relates to a process for the continuous dyeing of synthetic fiber materials from organic solvents; the process is characterized in that the fiber materials are impregnated with dyeing liquors which contain anthraquinone dyestuffs of formula

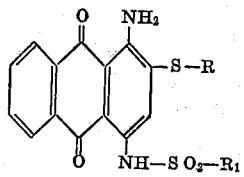

in which

R represents a $C_1$–$C_{18}$-alkyl radical, preferably $C_4$–$C_{12}$-alkyl radical, and $R_1$ denotes a $C_1$–$C_{18}$-alkyl radical, preferably $C_4$–$C_{12}$-alkyl radical, or an alkoxyalkyl, cycloalkyl or aralkyl radical or especially an optionally substituted phenyl radical, with the proviso that the sum of the carbon atoms present in total in R and $R_1$, is at least 6 and at most 36, and that the fiber materials are subsequently subjected to a heat treatment.

R can for example be the following $C_1$–$C_{18}$-alkyl radicals: the methyl, ethyl, propyl, iso-propyl n-butyl, iso-butyl, sec.-butyl, tert.-butyl, n-pentyl, iso-amyl, sec.-pentyl, neopentyl, methyl-pentyl, dimethyl-pentyl, n-hexyl, methyl-hexyl, dimethyl-pentyl, trimethyl-butyl, n-octyl, iso-octyl, methyl-heptyl, dimethyl-hexyl, trimethyl-pentyl, tetramethyl-butyl, iso-nonyl, dimethyl-heptyl, trimethyl-hexyl radical, n-decyl, dimethyl-octyl, n-dodecyl, dimethyl-decyl, n-tetradecyl, 2-pentadecyl, n-hexadecyl, tert.-hexadecyl and the n-octadecyl radical.

For $R_1$, there may for example be mentioned: as $C_1$–$C_{18}$-alkyl radicals, the methyl, ethyl, n-propyl, iso-propyl, n-butyl, iso-butyl, sec.-butyl, n-amyl, iso-amyl, n-hexyl, iso-hexyl, n-octyl, n-decyl, n-dodecyl, n-hexadecyl and the n-octadecyl radical; as alkoxyalkyl radicals, the β-methoxy-ethyl, β-ethoxy-ethyl, β-n-propoxy-ethyl and the β-n-butoxy-ethyl radical; as cycloalkyl radicals, the cyclohexyl and methyl-cyclohexyl radical; as aralkyl radicals, the benzyl radical, and as aryl radicals, the phenyl, methylphenyl, methoxyphenyl and chlorophenyl radical.

The dyestuffs used according to the invention for dyeing from organic solvents are obtained according to processes which are in themselves known, for example by reaction of 1-amino-4-alkyl-, -cycloalkyl-, -aralkyl- or -aryl-sulphonamido-anthraquinones which are substituted by chlorine or bromine in the 2-position, with appropriate mercaptoalkyl compounds, in the presence of inorganic or organic bases, optionally in inert organic solvents, such as pyridine, dimethylformamide or N-methylpyrrolidone. Another possibility for the manufacture of the dyestuffs to be used according to the invention is, for example, the reaction of 1,4-diamino-2-alkylmercapto-anthraquinones with aliphatic, cycloaliphatic, araliphatic or aromatic sulphochlorides in the presence of inorganic or organic bases, in inert organic solvents such pyridine, toluene or nitrobenzene.

Possible organic solvents for the process according to the invention are those solvents which are immiscible with water and of which the boiling points lie between 40° and 150° C., for example aromatic hydrocarbons, such as toluene and xylene, and halogenated hydrocarbons, especially aliphatic chloro-hydrocarbons, such as methylene chloride, chloroform, carbon tetrachloride, 1,1-dichlorethane, 1,2-dichlorethane, 1,1,2-trichlorethane, 1,1,1,2-tetrachlorethane, 1,1,2,2-tetrachlorethane, pentachlorethane, 1-chloropropane, 1,2-dichloropropane, 1,1,1-trichloropropane, 1-chlorobutane, 2-chlorobutane, 1,4-dichlorobutane, 1-chloro-2-methyl-propane or 2-chloro-2-methylpropane, as well as aliphatic fluoro- or fluoro-chloro-hydrocarbons, such as perfluoro-n-hexane, 1,2,2-trifluoro-trichlorethane and 1,1,1-trifluoro-pentachloropropane and aromatic chloro- and fluoro-hydrocarbons, such as chlorobenzene, fluorobenzene, chlorotoluene and benzotrifluoride.

Tetrachlorethylene, trichlorethylene and 1,1,1trichlorethane have proved particularly successful. Mixtures of these solvents can also be used.

The synthetic fiber materials to be dyed according to the process of the invention are especially fiber materials of polyesters, for example polyethylene terephthalates or polyesters from 1,4-bis-(hydroxymethyl)-cyclohexane and terephthalic acid, of cellulose triacetate, of synthetic polyamides, such as poly-ε-caprolactam, polyhexamethylenediamine adipate or poly-ω-aminoundecane-acid, of polyurethanes or of polyolefines. The fiber materials can be in the form of woven fabrics and knitted fabrics.

For dyeing, the dyestuffs to be used according to the invention are dissolved in the organic solvents which are immiscible with water, or added to these in the form of solutions in solvents which are infinitely miscible with these solvents, such as alcohols, dimethylformamide, dimethylacetamide, dimethylsulphoxide or sulpholane, and the synthetic fiber materials are impregnated with the resulting clear dyestuff solutions, which can optionally further contain soluble nonionic auxiliary agents for improving the uniformity of the dyeings, for example the known surface-active oxethylation and propoxylation products of fatty alcohols, alkylphenols, fatty acid amides and fatty acids. Thereafter the dyestuffs are fixed on the fiber materials by a heat treatment. The heat treatment can consist of a brief dry heat treatment at 120°–230° C., it being possible for the dry heat treatment to be optionally preceded by an intermediate drying, or can consist of a treatment of the fiber materials in superheated solvent vapor at 100°–150° C. Small amounts of nonfixed dyestuff can be eluted by brief treatment with cold organic solvent. It should be pointed out that mixtures of the dyestuffs according to the invention at times give a better color yield than the individual dyestuffs and may show better solubility in the organic medium.

With the aid of the process according to the invention it is possible, when dyeing from organic solvents, to achieve dyeings on synthetic fiber materials which are distinguished by high dyestuff yield, very good buildup and excellent fastness properties, especially very good fastness to thermofixing, washing, rubbing and light. A further advantage of the dyestuffs to be used according to the invention is their high solubility in organic solvents, especially in tetrachlorethylene, trichlorethylene, 1,1,1-trichlorethane and 1,1,1-trichloropropane which makes it possible to carry out the dyeing even without the use of solubilising agents.

The parts indicated in the examples which follow are parts by weight.

EXAMPLE 1

A woven fabric of polyethylene terephthalate fibers is impregnated at room temperature with a clear red solution which contains 10 parts of 1-amino-2-1,1,3,3-tetramethyl-butyl-mercapto-4-o-tosylamino-anthraquinone in 990 parts of tetrachlorethylene. After squeezing out to a weight increase of 60 percent, the woven fabric is dried for 1 minute at 80° C. Thereafter the dyestuff is fixed by heating the woven fabric to 190°–220° C. for 45 seconds. Thereafter the small amount of nonfixed dyestuff is eluted by brief treatment lasting 20 seconds in cold tetrachlorethylene. After drying, a clear ruby-red dyeing is obtained, which is distinguished by its high dyestuff yield, very good buildup and excellent fastness properties, especially very good fastness to thermofixing, washing, rubbing and light.

Equivalent clear ruby-red dyeings were also obtained analogously on woven fabrics of (a) cellulose triacetate, (b) synthetic polyamides or polyurethanes and (c) polypropylene fibers; the only difference was that the thermosol treatment was carried out at 200°–220° C. for (a), at 170°–200° C. for (b) and at 120°–150° C. for (c).

Equivalent dyeings were also obtained if the 990 parts of tetrachlorethylene were replaced by the same amount of one of the following solvents: methylene chloride, chloroform, carbon tetrachloride, dichlorethane, trichlorethane, trichlorethylene, tetrachlorethane, dichloropropane, 1,1,1-trichloropropane, chlorobutane, dichlorobutane, 1,2,2-trifluoro-trichlorethane, 1,1,1-trifluoropentachloropropane, and perfluoro-n-hexane.

The dyestuffs used has been manufactured as follows: a solution of 15 parts of 1-amino-2-bromo-4-o-tosylamino-anthraquinone in 150 parts of pyridine was mixed with 4 parts of potassium hydroxide, warmed to 60° C. after addition of 15 parts of tert.-octylmercaptan, and subsequently stirred for one-half hour at this temperature. The dyestuff formed was then precipitated by adding 150 parts of methanol and 5 parts of glacial acetic acid and was dried after filtering off and washing with methanol and water. 11.1 parts of the dyestuff indicated were obtained.

EXAMPLE 2

A knitted fabric of polyhexamethylenediamine adipate filaments is impregnated at room temperature with a clear red solution which contains 10 parts of 1-amino-2-n-dodecylmercapto-4-p-tosylamido-anthraquinone and 7 parts of nonylphenol-heptaglycol-ether in 983 parts of tetrachlorethylene. After squeezing out to a weight increase of 60 percent the knitted fabric is dried for 1 minute at 80° C. Thereafter the dyestuff is fixed by heating the knitted fabric to 192° C. for 45 seconds. Small amounts of nonfixed dyestuff are then eluted by brief treatment, lasting about 20 seconds, in cold tetrachlorethylene. After drying, a clear ruby-red dyeing is obtained, which is distinguished by its high dyestuff yield, very good buildup and excellent fastness properties, especially very good fastness to thermofixing, washing, rubbing and light.

An equivalent clear ruby-red dyeing was obtained analogously on woven fabrics of anionically modified polyhexamethylenediamine adipate.

An equivalent dyeing was also obtained if instead of the 983 parts of tetrachlorethylene the same amount of toluene, xylene, chlorobenzene, o-dichlorobenzene, 1,2,2-trifluoro-trichlorethane or fluorobenzene is used.

The dyestuff used had been manufactured as follows:
10 parts of 1-amino-2-bromo-4-p-tosylamino-anthraquinone were dissolved in 150 parts of N-methylpyrrolidone and mixed with 2.5 parts of powdered potassium hydroxide and 10 parts of n-dodecylmercaptan. The reaction mixture was then warmed to 60° C., stirred for one-quarter hour at this temperature and mixed with 150 parts of methanol and 5 parts of glacial acetic acid. After several hours' standing the dyestuff which had separated out was filtered off, washed with methanol and water, and dried at 80° C. Yield: 11.8 parts of dyestuff. After recrystallization from pyridine, the dyestuff melts at 112°–113° C.

EXAMPLE 3

A woven fabric of polypropylene fibers is impregnated at room temperature with a clear red solution which contains 10 parts of 1-amino-2-heptylmercapto-4-cyclohexyl-sulphonamido-anthraquinone and 7 parts of nonylphenol-heptaglycol-ether in 983 parts of tetrachlorethylene. After squeezing out to a weight increase of 60 percent, the woven fabric is dried for 1 minute at 80° C. Thereafter the dyestuff is fixed by heating the woven fabric to 140° C. for 30 seconds. Nonfixed amounts of dyestuff can be eluted by brief treatment in cold solvent. A clear, ruby-red dyeing is obtained, which is distinguished by high dyestuff yield, very good buildup and excellent fastness properties, especially very good fastness to thermofixing, washing, rubbing and light.

The dyestuff used had been manufactured as described in Example 2, except that instead of the n-dodecylmercaptan the equivalent amount of heptylmercaptan was employed and instead of the 1-amino-2-bromo-4-p-tosylamido-anthraquinone the equivalent amount of 1-amino-2-bromo-4-cyclohexyl-sulphonamido-anthraquinone was employed.

EXAMPLE

A woven fabric of poly-1,4-cyclohexanedimethylene terephthalate is impregnated at room temperature with a clear red solution which contains 10 parts of 1-amino-2-undecyl-mercapto-4-benzylsulphonamido-anthraquinone and 7 parts of nonylphenol-heptaglycol-ether in 983 parts of tetrachlorethylene. After squeezing out to a weight increase of 60 percent, the woven fabric is dried for 1 minute at 80° C. Thereafter the dyestuff is fixed by heating the woven fabric to 190°–220° C. for 45 seconds. The small amount of nonfixed dyestuff is then eluted by brief treatment in cold tetrachlorethylene. After drying, a clear ruby-red dyeing is obtained, which is distinguished by its high dyestuff yield, very good buildup as well as excellent fastness properties, especially very good fastness to thermofixing, washing, rubbing and light.

A clear ruby-red dyeing is obtained analogously on anionically modified polyethylene terephthalate.

The dyestuff used had been manufactured as described in Example 2, except that instead of the n-dodecylmercaptan the equivalent amount of undecylmercaptan was employed and instead of the 1-amino-2-bromo-4-tosylamino-anthraquinone the equivalent amount of 1-amino-2-bromo-4-benzyl-sulphonamido-anthraquinone was employed.

EXAMPLE 5

A woven fabric of polyethylene terephthalate fibers is impregnated at room temperature with a clear red solution which contains 10 parts of 1-amino-2-decylmercapto-4-p-tosylamino-anthraquinone and 7 parts of nonylphenol-heptaglycol-ether in 983 parts of tetrachlorethylene. After squeezing out to a weight increase of 60 percent, the woven fabric is dried for 1 minute at 80° C. Thereafter the dyestuff is fixed by heating the woven fabric to 190°–220° C. for 45 seconds. The small amount of nonfixed dyestuff is then eluted by brief rinsing with cold tetrachlorethylene. After drying, a clear ruby-red dyeing is obtained, which is distinguished by its high dyestuff yield, very good buildup as well as excellent fastness properties, especially very good fastness to thermofixing, washing, rubbing and light.

The dyestuff used had been manufactured as follows:
5 parts of 1,4-diamino-2-decylmercapto-anthraquinone were dissolved in 60 parts of pyridine and mixed with 5 parts of p-toluenesulphochloride. The reaction mixture was heated to the boil for one-half hour and then cooled to 80° C. The dyestuff formed was separated out by adding 20 parts of water to the reaction mixture. After filtering off and washing with methanol and water, 6.2 parts of the dyestuff indicated were obtained.

EXAMPLE 6

A woven fabric of polyethylene terephthalate fibers is impregnated at room temperature with a clear red solution which contains 10 parts of 1-amino-2-(3-hexylmercapto)-benzene-sulphonamido-anthraquinone in 990 parts of 1,1,1-trichlorethane. After squeezing out to a weight increase of 60 percent, the dyestuff is fixed by treating the woven fabric with superheated 1,1,1-trichlorethane vapor at 140° C. for 45 seconds. Thereafter the small amount of nonfixed dyestuff is eluted by brief rinsing in cold 1,1,1-trichlorethane. After drying, a clear ruby-red dyeing is obtained, which is distinguished by its high dyestuff yield, very good buildup and excellent fastness properties.

The dyestuff used had been manufactured as described in Example 5, except that instead of 1,4-diamino-2-decylmercapto-anthraquinone and p-toluenesulphochloride the equivalent amounts of 1,4-diamino-2-(3-hexylmercapto)-anthraquinone and benzenesulphochloride were employed.

EXAMPLE 7

A woven fabric of poly-1,4-cyclohexanedimethylene terephthalate is impregnated at room temperature with a clear red solution which contains 10 parts of 1-amimo-2-tetradecyl-mercapto-4-p-benzenesulphonamido-anthraquinone in 990 parts of tetrachlorethylene. After squeezing out to a weight increase of 60 percent, the dyestuff is fixed by heating the woven fabric with superheated tetrachlorethylene vapor at 150° C. for 35 seconds. The small amount of nonfixed dyestuff is then eluted by brief rinsing in cold tetrachlorethylene. After drying, a clear ruby-red dyeing is obtained, which is distinguished by its high dyestuff yield, very good buildup and excellent fastness properties.

The dyestuff used had been manufactured as described in Example 2, except that instead of n-dodecylmercaptan and p-toluenesulphochloride the equivalent amounts of tetradecyl-mercaptan and benzenesulphochloride were employed.

Clear ruby-red dyeings with excellent fastness properties were also obtained on polyester, triacetate, polyamide, polyurethane and polyolefine fibers if instead of the indicated dyestuff the same amount of one of the dyestuffs indicated in the Table which follows was used:

| Example | Dyestuff |
| --- | --- |
| 8 | 1-Amino-2-butylmercapto-4-cyclohexylsulphonamido-anthraquinone |
| 9 | 1-Amino-2-butylmercapto-4-tosylamido-anthraquinone |
| 10 | 1-Amino-2-pentylmercapto-4-benzenesulphonamido-anthraquinone |
| 11 | 1-Amino-2-benzylmercapto-4-pentylsulphonamido-anthraquinone |
| 12 | 1-Amino-2-dodecylmercapto-4-methanesulphonamido-anthraquinone |
| 13 | 1-Amino-2-dodecylmercapto-4-benzylsulphonamido-anthraquinone |
| 14 | 1-Amino-2-(iso-propyl-mercapto)-4-dodecylsulphonamido-anthraquinone |
| 15 | 1-Amino-2-(2-methyl-propyl-mercapto)-4-hexylsulphonamido-anthraquinone |
| 16 | 1-Amino-2-(tert.-butyl-mercapto)-4-cyclohexylsulphonamido-anthraquinone |
| 17 | 1-Amino-2-(2-[2-methyl-butyl-mercapto])-4-o-tosylamino-anthraquinone |
| 18 | 1-Amino-2-hexylmercapto-4-hexadecylsulphonamido-anthraquinone |
| 19 | 1-Amino-2-(3-methyl-butyl-mercapto)-4butylsulphonamido-anthraquinone |
| 20 | 1-Amino-2-octylmercapto-4-dodecylsulphonamido-anthraquinone |
| 21 | 1-Amino-2-decylmercapto-4-p-methoxybenzenesulphonamido-anthraquinone |
| 22 | 1-Amino-2-undecylmercapto-4-(2-propoxy-ethylsulphonamido)-anthraquinone |
| 23 | 1-Amino-2-hexadecylmercapto-4-(2-ethoxy-ethylsulphonamido)-anthraquinone |
| 24 | 1-Amino-2-octadecylmercapto-p-tosylamino-anthraquinone |

EXAMPLE 25

A woven fabric of cellulose triacetate fibers is impregnated at room temperature with a clear red solution which contains 6.5 parts of 1-amino-2-(2,4,4,6,6-pentamethyl-heptyl-mercapto)-4-benzenesulphonamido-anthraquinone and 3.5 parts of 1-amino-2-(2,2,4,6,6-pentamethyl-heptyl-mercapto)-4-benzenesulphonamido-anthraquinone in 990 parts of tetrachlorethylene. After squeezing out to a weight increase of 60 percent the woven fabric is dried for 1 minute at 80° C. Thereafter the dyestuff is fixed by heating the woven fabric to 215° C. for 1 minute. A clear, ruby-red dyeing is obtained which is distinguished by high dyestuff yield, very good buildup and excellent fastness properties, especially very good fastness to thermofixing, washing, rubbing and light.

The dyestuff mixture used had been manufactured as follows: a solution of 10 parts of 1-amino-2-bromo-4-benzenesulphonamido-anthraquinone in 80 parts of pyridine was mixed with 3 parts of powdered potassium hydroxide and 12 parts of a 2 : 1 mixture of 2,4,4,6,6-pentamethyl- and 2,2,4,6,6-pentamethyl-mercaptan and subsequently warmed to 60° C. for one-half hour. After completion of the reaction, the resulting dyestuff was precipitated by adding 100 parts of methanol and 4 parts of glacial acetic acid, filtered off, washed with methanol and water and dried. 12.2 parts of the dyestuff mixture indicated were obtained.

We claim:

1. Process for the continuous dyeing of synthetic fiber materials from organic solvents, characterized in that the fiber materials are impregnated with dyestuff liquors which contain anthraquinone dyestuffs of formula

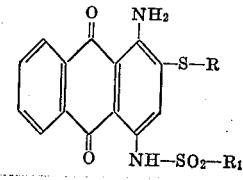

in which

R represents a $C_1$–$C_{18}$-alkyl radical and $R_1$ denotes a $C_1$–$C_{18}$-alkyl, alkoxyalkyl, cycloalkyl or aralkyl radical or an optionally substituted phenyl radical, with the proviso that the sum of the carbon atoms present in total in R and $R_1$ is at least 6 and at most 36, and that the fiber materials are subsequently subjected to a heat treatment.

2. Process according to claim 1 characterized in that mixtures of the dyestuffs quoted in claim 1 are used.

3. Synthetic fiber materials dyed according to claim 1 and 2.

* * * * *

UNITED STATES PATENT OFFICE
CERTIFICATE OF CORRECTION

Patent No. 3,642,425          Dated February 15, 1972

(S.N. 66,065)

Inventor(s) GUNTER GEHRKE ET AL.

It is certified that error appears in the above-identified patent and that said Letters Patent are hereby corrected as shown below:

| | | |
|---|---|---|
| Title: | Third Line | "ANTHRAQUINOUS" should be --- ANTHRAQUINONE ---. |
| Abstract: | Line 2 | "characterized in that" should be --- wherein ---. |
| Col. 1 | Third line of Title | "ANTHRAQUINOUS" should be --- ANTHRAQUINONE ---. |
| Col. 4 | Line 8 | "EXAMPLE" should be --- EXAMPLE 4 ---. |
| Col. 6 | Line 32 | "characterized in that" should be --- wherein ---. |
| Col. 6 | Line 52 | "characterized in that mixtures of the dyestuffs quoted in claim 1 are used" should be --- wherein said fiber materials are impregnated with mixtures of said dyestuffs ---. |
| Col. 6 | Line 54 | "claim 1 and 2" should be --- claim 1 ---. |

Signed and sealed this 13th day of November 1973.

(SEAL)
Attest:

EDWARD M. FLETCHER, JR.　　　　RENE D. TEGTMEYER
Attesting Officer　　　　　　　　Acting Commissioner of Patents